United States Patent
Varnham et al.

(10) Patent No.: US 7,592,568 B2
(45) Date of Patent: Sep. 22, 2009

(54) APPARATUS FOR THE INDUSTRIAL PROCESSING OF A MATERIAL BY OPTICAL RADIATION

(75) Inventors: Malcolm Paul Varnham, Alresford (GB); Mikhail Nickolaos Zervas, Southampton (GB)

(73) Assignee: SPI Lasers UK Ltd., Southampton (GB)

( * ) Notice: Subject to any disclaimer, the term of this patent is extended or adjusted under 35 U.S.C. 154(b) by 358 days.

(21) Appl. No.: 11/446,865

(22) Filed: Jun. 5, 2006

(65) Prior Publication Data

US 2006/0219673 A1    Oct. 5, 2006

Related U.S. Application Data

(63) Continuation-in-part of application No. PCT/GB2004/005113, filed on Dec. 6, 2004.

(30) Foreign Application Priority Data

Dec. 5, 2003    (GB)    ..................... 0328370

(51) Int. Cl.
*B23K 26/06* (2006.01)
*H01S 3/30* (2006.01)

(52) U.S. Cl. .................. 219/121.73

(58) Field of Classification Search ............ 372/6; 219/121.73, 121.75; 385/123, 124, 126, 385/127; 359/341.1

See application file for complete search history.

(56) References Cited

U.S. PATENT DOCUMENTS

| | | | |
|---|---|---|---|
| 3,777,150 A | 12/1973 | Miller | |
| 4,467,168 A * | 8/1984 | Morgan et al. | 219/121.67 |
| 5,028,118 A | 7/1991 | Facq et al. | |
| 5,220,149 A | 6/1993 | Neidhardt | |
| 5,231,464 A | 7/1993 | Ichimura et al. | |
| 5,237,150 A * | 8/1993 | Karube | 219/121.84 |
| 5,469,292 A | 11/1995 | Bjarklev et al. | |
| 5,570,384 A * | 10/1996 | Nishida et al. | 372/19 |
| 5,609,781 A | 3/1997 | Kaga et al. | |
| 5,684,617 A * | 11/1997 | Langhans | 219/121.7 |
| 5,747,771 A | 5/1998 | O'Neil | |

(Continued)

FOREIGN PATENT DOCUMENTS

EP    0993086    4/2000

(Continued)

OTHER PUBLICATIONS

Katsumi Morishi, Index Profiling of Three-Diemensional Optical Waveguides by the Propagation-Mode Near-Field Method, Journal of Lightwave Technology, Aug. 1986, pp. 1120-1124, vol. LT-4 No. 8, IEEE/OSA publication.

*Primary Examiner*—Geoffrey S Evans
(74) *Attorney, Agent, or Firm*—John S. Reid

(57) ABSTRACT

Apparatus for the industrial processing of a material by a fiber laser, which fiber laser emits optical radiation, the apparatus configured such that the optical radiation forms an optical power distribution on a surface of the material, including first and second optical powers which are located at respective first and second radii from a center of the optical power distribution and which are of substantially higher intensity than a third optical power which is located at a third radius from the center of the optical power distribution and which is smaller than the first and the second radii.

12 Claims, 6 Drawing Sheets

U.S. PATENT DOCUMENTS

| | | |
|---|---|---|
| 5,877,890 A | 3/1999 | Snitzer |
| 5,956,447 A | 9/1999 | Zel'Dovich et al. |
| 6,018,533 A * | 1/2000 | Krivoshlykov .................. 372/6 |
| 6,118,097 A | 9/2000 | Kaga |
| 6,288,363 B1 | 9/2001 | Kaga |
| 6,288,835 B1 | 9/2001 | Nilsson |
| 6,376,797 B1 | 4/2002 | Piwczyk et al. |
| 6,423,928 B1 | 7/2002 | Piwczyk |
| 6,487,340 B2 | 11/2002 | Enomoto |
| 6,614,975 B2 * | 9/2003 | Richardson et al. ......... 385/127 |
| 6,687,046 B2 * | 2/2004 | Leplingard et al. ............. 372/6 |
| 7,215,858 B2 * | 5/2007 | Po .............................. 385/127 |
| 7,259,907 B2 * | 8/2007 | Langhans ....................... 372/6 |
| 2002/0080832 A1 * | 6/2002 | Chang et al. .................... 372/6 |
| 2002/0088784 A1 * | 7/2002 | Bertez ................... 219/121.84 |
| 2002/0153360 A1 * | 10/2002 | Yamazaki et al. ...... 219/121.84 |
| 2002/0181512 A1 * | 12/2002 | Wang et al. ..................... 372/6 |
| 2004/0104202 A1 * | 6/2004 | Downes et al. ......... 219/121.68 |

FOREIGN PATENT DOCUMENTS

| | | | |
|---|---|---|---|
| JP | 60-263427 A | * | 12/1985 |
| JP | 2000-91678 A | * | 3/2000 |
| JP | 2000-111753 A | * | 4/2000 |

* cited by examiner

APPARATUS FOR THE INDUSTRIAL PROCESSING OF A MATERIAL BY OPTICAL RADIATION

CROSS REFERENCE TO RELATED APPLICATIONS

The present application is a continuation-in-part of Patent Cooperation Treaty ("PCT") patent application number PCT/GB2004/005113, filed Dec. 6, 2004 and which designates the United States, which in turn claims priority to United Kingdom (Great Britain) Patent Application Serial Number GB 0328370.2, filed Dec. 5, 2003, both of which are hereby incorporated by reference herein in their entirety.

FIELD OF INVENTION

This invention relates to apparatus for the industrial processing of a material by optical radiation. The apparatus can take various forms, for example a laser, a Q-switched fibre laser, a master oscillator power amplifier, or a laser that contains a frequency converter.

BACKGROUND

Pulsed NdYAG lasers are widely used in industrial processes such as welding, cutting and marking. Care has to be taken in these processes to ensure that the plasmas generated by the laser do not interfere with the incoming laser pulses. The relatively low pulse repetition rates (6 kHz) at high peak powers that are achievable in a NdYAG laser have led to their wide application in laser machining.

Fibre lasers are increasingly being used in industry for the processing of materials by, for example, the welding, cutting and marking of the materials. The advantages of fibre lasers include high efficiency, robustness and high beam quality. Examples include femtosecond lasers for multiphoton processing such as the imaging of biological tissues, Q-switched lasers for machining applications, and high-power continuous-wave lasers. The disadvantage of the fibre lasers is their relatively low energy storage capacity as compared to NdYAG lasers. A relatively higher energy storage capacity is an advantage because it allows higher energy pulses to be released from the laser in Q-switched applications.

In many instances, fibre lasers need to compete with the more mature diode pumped solid state lasers. In order to do so, much greater optical powers need to be achieved, with high reliability and lower cost.

Fibre lasers are typically longer than diode-pumped solid state lasers, and this leads to non-linear limitations such as Raman scattering becoming problematical. It would be advantageous to have fibre lasers that are shorter.

Fibre lasers are typically pumped with diode lasers in bar or stack form. The output from bars and stacks is not ideally matched to the geometry of fibre lasers, leading to a loss in brightness, and thus the need to increase the length of cladding pumped fibre lasers in order to obtain the necessary absorption and output energy. Fibre lasers are increasingly being pumped with single-emitter laser diodes whose outputs are combined together.

Fibre lasers are also competing with solid state disk lasers in the industrial processing of many materials. Power levels of several kilowatts are often required, and in many instances control of beam quality, efficiency and/or the beam profile would give the fibre laser advantages over the disk laser.

In certain processes, such as the cutting of metal, there are advantages in combining lasers with a gas such as oxygen, nitrogen or a noble gas. U.S. Pat. Nos. 5,220,149, 5,609,781, 5,747,771, 6,118,097, 6,288,363, 6,376,797 and 6,423,928, which are hereby incorporated herein by reference describe various applications where gases and lasers are utilized together. In one example, a laser nozzle directs both a laser beam and a flow of oxygen gas onto sheet metal. The laser beam heats the metal to initiate cutting and the oxygen gas acts as a cutting gas to cut into or through the metal. This process requires a high energy laser beam to heat the metal. An advantage would be gained by reducing the energy of the laser beam that is required without dependence on diffractive or holographic optics. This would be especially useful for high power fibre lasers since these are generally much less coherent than conventional solid-state lasers. Linewidths of 1 nm to 5 nm are common in high power fibre lasers. A further advantage would be gained by providing a fibre delivery system which would simplify the system required to direct the laser nozzle.

An aim of the present invention is to provide apparatus for the industrial processing of a material by optical radiation that reduces the above aforementioned problems.

SUMMARY

According to a non-limiting embodiment of the present disclosure, there is provided apparatus for the industrial processing of a material by optical radiation, which apparatus comprises a waveguide for delivering the optical radiation, and focusing optics for directing the optical radiation from an output end of the waveguide onto the material, wherein the waveguide has a guidance profile across its cross section defined by its refractive index profile and optical gain profile, and wherein the guidance profile and focusing optics are such that optical power distribution at the surface of the material has first and second optical powers which are located at first and second radii from the centre of the optical power distribution and which are of substantially higher intensity than a third optical power at a third radius that is smaller than the first and the second radii.

In certain industrial processes such as cutting, the optical radiation near the centre of the beam does not provide as much processing power as the optical radiation at the edges of the beam. There are advantages for a beam with well-defined edges. Such a beam can be created using diffractive optics, but such optics are inconvenient to install in laser processing heads. An altogether better solution, and one that is more applicable for fibre lasers that emit laser radiation having a spectral width of 1 nm to 5 nm, is to tailor the guidance profile of the waveguide such that it provides the optical radiation in a form optimized for the process. Such a solution will also be temporally stable.

The apparatus can be one in which there is defined an optical power distribution at the output end of the waveguide that is related to the optical power distribution at the surface of the material by an inverse transform of the focusing optics. The guidance profile of the waveguide can be an inversion of the optical power distribution at the output end of the waveguide.

The waveguide can be an optical fibre or a planar waveguide.

The optical power distribution at the surface of the material can have a ring-shaped power distribution. Alternatively or additionally, the optical power distribution at the surface of the material can have a central zone having a higher power distribution than the outer regions.

The waveguide can have at least one core and at least one cladding.

The waveguide can be a multimode waveguide, and the guidance profile of the multimode waveguide can be substantially proportional to the optical power distribution at the output end of the waveguide.

The waveguide can be a single mode waveguide.

The waveguide can be defined by a numerical aperture, which numerical aperture is between 0.05 to 0.2. The numerical aperture can be between 0.07 and 0.1.

The apparatus can include at least one laser for providing the optical radiation. The laser can be configured to emit laser radiation having substantially the same power distribution as the optical radiation emitted by the waveguide. Alternatively, the laser can emit laser radiation having a different power distribution then the optical radiation emitted by the fibre. The laser can a single mode laser.

The waveguide can comprise one or more rare earth dopants selected from the group comprising Ytterbium, Erbium, Neodymium, Praseodymium, Thulium, Samarium, Holmium, Europium, Terbium, and Dysprosium.

The waveguide can be pumped by at least one semiconductor laser.

The waveguide can be cladding pumped.

The waveguide can be core pumped.

The waveguide can be a large mode area waveguide.

The apparatus can be in the form of an optical amplifier, a laser, or a master oscillator power amplifier.

The optical radiation can be pulsed, modulated or continuous wave. The apparatus can include a frequency conversion device.

The apparatus can include a laser nozzle and a gas delivery system.

The waveguide can be configured to emit optical radiation having between 10 W and 1 kW of optical power. The waveguide can be configured to emit optical radiation having between 10 W and 200 W of optical power.

An advantage of the invention is that the power of the laser beam required to process a material can be lower in many applications than if the laser beam were to be provided in the form of a conventional bell-shaped (Gaussian) or top-hat profile. This is because the energy at the centre of the beam profile is often not required to process the material. It is then possible to process materials with the same processing speeds using optical power levels lower by a factor of between 2 and 20, or alternatively, to process thicker materials with the same optical power levels. Tailoring the guidance profile of the waveguide in order to optimize the power distribution on the surface of the material to be processed can thus be seen to have major economic advantages, particularly with gas-assisted laser cutting where a 100 W of laser radiation having a doughnut, ring, multi-spot, or other power distribution on the surface of the material according to the present invention can have similar performance to a conventional 1 kW or higher power laser that delivers a top-hat or bell-shaped power distribution on the surface of the material. The invention is also far simpler and thus cheaper and more efficient than using diffractive or holographic techniques to convert a top hat profile to a ring-shaped power distribution on the surface of a material. It can also be temporally more stable.

BRIEF DESCRIPTION OF THE DRAWINGS

Embodiments of the invention will now be described solely by way of example and with reference to the accompanying drawings in which.

DETAILED DESCRIPTION

Figure 1:
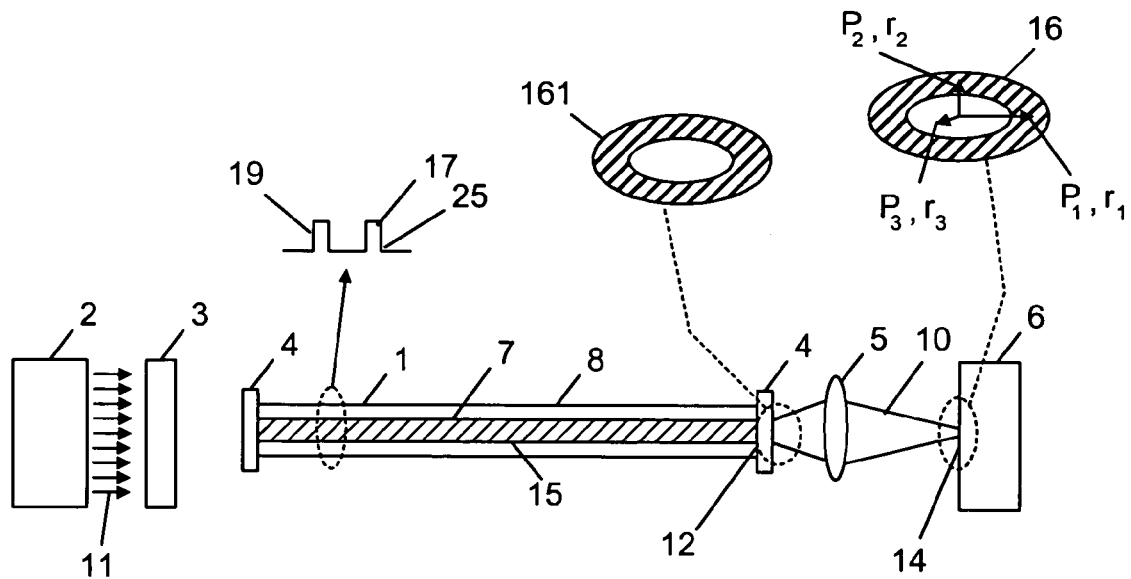
FIG. 1 shows first apparatus for the industrial processing of a material by optical radiation.

With reference to FIG. 1, there is provided apparatus for the industrial processing of a material 6 by optical radiation 10, which apparatus comprises a waveguide 1 for delivering the optical radiation 10, and focusing optics 5 for directing the optical radiation 10 from an output end 12 of the waveguide 1 onto the material 6, wherein the waveguide 1 has a guidance profile 19 across its cross section defined by its refractive index profile 25 and optical gain profile 17, and wherein the guidance profile 19 and focusing optics 5 are such that optical power distribution 16 at the surface 14 of the material 6 has first and second optical powers $P_1$, $P_2$ which are located at first and second radii $r_1$, $r_2$ from the centre of the optical power distribution 16 and which are of substantially higher intensity than a third optical power $P_3$ at a third radius $r_3$ that is smaller than the first and the second radii $r_1$, $r_2$.

In certain industrial processes such as cutting, the optical radiation near the centre of the beam does not provide as much processing power as the optical radiation at the edges of the beam. There are advantages for a beam with well-defined edges. Such a beam can be created using diffractive optics, but such optics are inconvenient to install in laser processing heads. An altogether better solution is to tailor the guidance profile of the waveguide such that it provides the optical radiation in a form optimized for the process. Such a solution will also be temporally stable.

The industrial processing of the material 6 can include at least one of cutting, drilling, engraving, welding, marking, printing, manufacturing, repairing, coding, or trimming in the medical devices, semiconductor, electronic, automotive, ship-building, and aerospace manufacturing industries.

The waveguide 1 can be an optical fibre or a planar waveguide. The waveguide 1 is shown as comprising a core 7 and a cladding 8. Alternatively, or additionally, the waveguide 1 can comprise a plurality of cores 7 and/or a plurality of claddings 8.

The optical radiation 10 can be pulsed, modulated or continuous wave.

The coupling optics 5 transforms an optical power distribution 161 at the output end 12 of the waveguide 1 into the optical power distribution 16. Thus the optical power distribution 161 at the output end 12 of the waveguide 1 is related to the optical power distribution 16 at the surface 14 of the material 6 by the inverse transform of the focusing optics 5. If the focusing optics are simply a lens or combination of lenses that image the near field of the waveguide onto the material, then the transform is a Fourier transform, and the inverse transform an inverse Fourier transform. The focusing optics 5 can comprise at least one lens and can include a scanner for scanning the optical radiation 10 over the material 6. The coupling optics 5 can also comprise a spectral filter, spatial filter, reflector, mirror, or diffractive optics. In these cases the transform is more complicated and numerical methods may be required to calculate the optical power distribution 161 on the end 12 of the waveguide 1.

Figure 2:
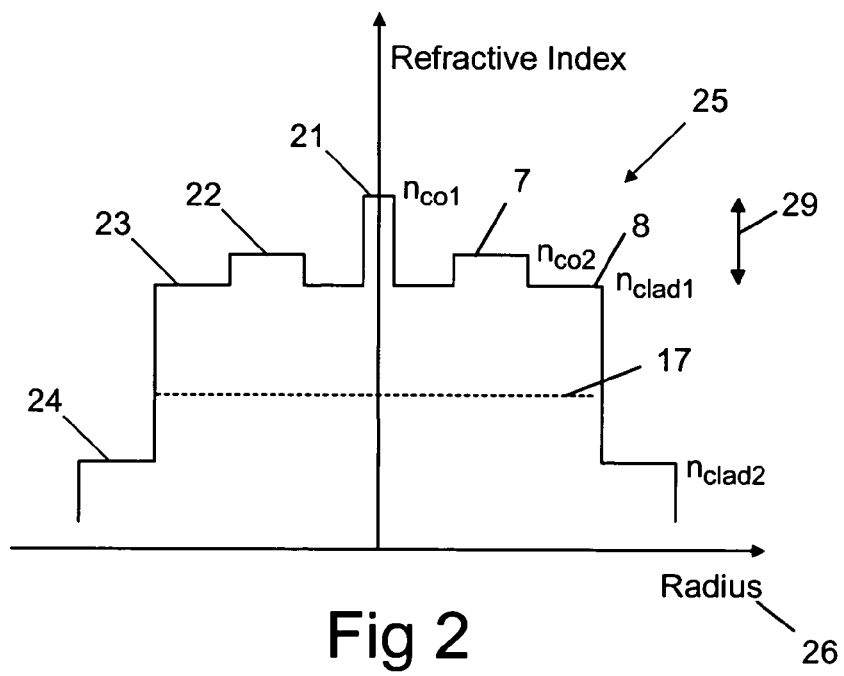
FIG. 2 shows an example refractive index profile.

FIG. 2 shows an example of the refractive index profile 25 for the waveguide 1 which in this case is an optical fibre. The core 7 has two parts, an inner region 21 having a refractive index $n_{co1}$, and an annular outer region 22 having a refractive index $n_{co2}$. The cladding 8 comprises a first cladding 23 having a refractive index $n_{clad1}$, and a second cladding 24 having a refractive index $n_{clad2}$. The second cladding 24 can be a polymer or can be fluorosilicate. The fibre 1 can be a silica fibre doped with germanium, phosphorus, aluminum, fluorine and/or boron to provide the desired refractive index profile 25.

The guidance profile 19 of the waveguide 1 is also affected by its optical gain profile 17, which in this case is shown as being uniform across the cross-section of the core 7. As shown with respect to FIG. 1, an optical gain profile 17 can be provided by doping the waveguide 1 with rare-earth dopant 15 and pumping the rare-earth dopant with pump radiation 11 provided by a pump source 2, and which is coupled into the waveguide 1 using coupling optics 3 such as lenses. The rare earth dopant 15 can be selected from the group comprising Ytterbium, Erbium, Neodymium, Praseodymium, Thulium, Samarium, Holmium, Europium, Terbium, and Dysprosium. The gain profile 17 is in this case proportional to the concentration of rare earth dopant, and can be uniform (as shown), can vary across the core 7, or can be in proportion to the refractive index profile 25.

The apparatus of FIG. 1 includes reflectors 4, and is in the form of a laser. The reflectors 4 can be fibre Bragg gratings, gratings, mirrors, or dichroic mirrors. The pump source 2 can be a semiconductor laser diode, or a plurality of laser diodes in single emitter, bar or stack form. The fibre 1 can be cladding pumped or side pumped.

Preferably the waveguide 1 is doped with either Ytterbium for emitting in the wavelength range 1000 nm to 1150 nm, Erbium Ytterbium for emitting in the wavelength range 1530 nm to 1560 nm, or Erbium for emitting in the wavelength range 1530 nm to 1610 nm. Ytterbium and Erbium/Ytterbium lasers can be pumped with highly reliable 915 to 980 nm semiconductor lasers, and Erbium and Erbium/Ytterbium can be pumped with 980 nm semiconductor lasers or in-band pumped—e.g., with 1480 nm semiconductor lasers.

Figures 3, 4, 5, 6, 7:
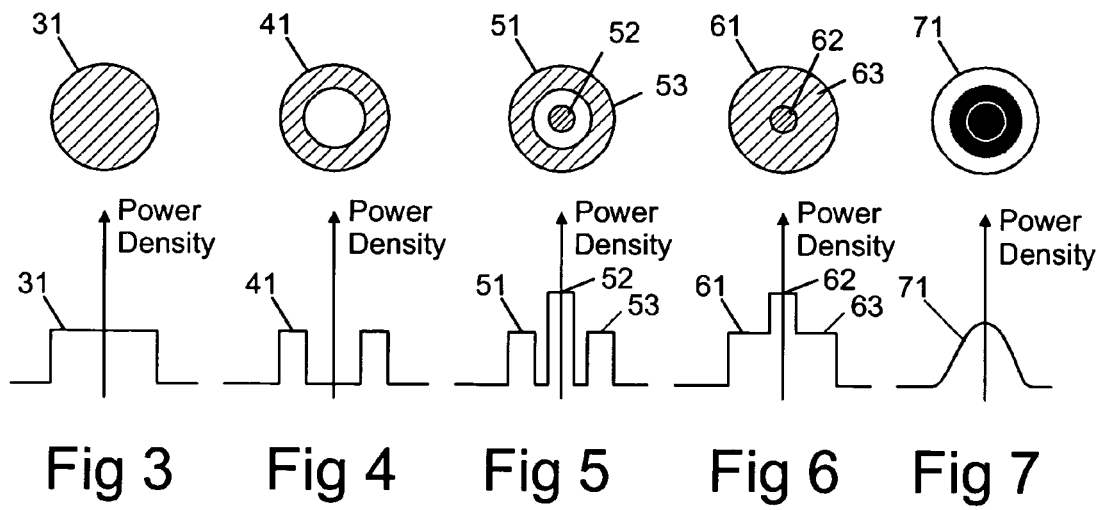
FIGS. 3 to 7 show different power distributions.

FIGS. 3 to 7 show various optical power distributions 12 (in plan and cross-section view for ease of comparison and understanding) that are advantageous for the industrial processing of materials. FIG. 3 has a top-hat power distribution 31. FIG. 4 a ring-shaped (or doughnut) distribution 41. FIG. 5 a ring-shaped distribution 51 with a central zone 52 having a higher power density than the outer region 53. FIG. 6 a top-hat distribution 61 having a central zone 62 having a higher power density than the outer region 63. FIG. 7 a bell-shaped (such as Gaussian) power distribution 71.

Referring to FIG. 1, the guidance profile 19 of the waveguide 1 is given by an inversion of the optical power distribution 161 at the output end 12 of the waveguide 1. For example, if the waveguide 1 contains no rare-earth dopant 15, then the gain profile 17 is zero, and the guidance profile 19 is given by the refractive index profile 25 of the waveguide 1. If the waveguide 1 is a multi-mode waveguide, then the refractive index profile 25 is substantially proportional to the optical power distribution at the output end of the waveguide. Alternatively, if the waveguide 1 is a single mode waveguide, then the refractive index profile 25 can be found from an inversion that is provided by a closed-form, approximated formula for the case of single mode fibres, which uniquely relates the radial power distribution P and the refractive index profile n. Here k is the wavenumber (=2π/wavelength), and r is radius. This formula assumes a lossless waveguide in the weakly guiding approximation (i.e., a low refractive index contrast fibre). Complex numerical inversion of the Maxwell's equations is necessary when lossy fibres, or high refractive index contrast waveguides are considered.

$$n^2(r) = const. - \frac{1}{k^2 P}\left[\frac{1}{2}\frac{d^2 P}{dr^2} - \frac{1}{4P}\left(\frac{dP}{dr}\right)^2 + \frac{1}{2r}\frac{dP}{dr}\right],$$

where k is the propagation constant in vacuum at the considered wavelength, P is the radial power distribution, and r refers to the radial coordinate in the fibre. The formula is derived from Maxwell's equations applying the scalar approximation, and is valid when the waveguide is axially symmetric, the absorption loss is negligibly small, and the refractive index difference is small. A simple extension allows the computation of non-axially symmetric structures using the same approach. Direct numerical inversion of Maxwell's equations is necessary when lossy fibres of high index contrast fibres are considered. See for example K. Morishita, Journal of Lightwave Technology, vol. 4, no. 8, pp. 1120-1124, August 1986 for further information.

By the guidance profile 19, it is meant a combination of the distribution of the refractive index profile 25 and gain profile 17. Also important are the launching conditions and modal scrambling properties of the waveguide since these affect the power distribution 161 at the output 12.

In active waveguides (such as those containing rare earth dopant or which rely on non-linear effects such as stimulated Raman or Brillouin scattering to provide gain), the refractive index profile 25 and the gain profile 17 (e.g., the distribution of rare earth dopants 15) are mainly responsible for the output power distribution 12. The gain profile 17 alone is relevant when highly multimoded fibres are considered, in which case the gain profile 17 is approximately proportional to the output power distribution 161. Conversely, the refractive index profile 25 alone is important in single moded fibres in which case the above equation can be used to carry out the inversion. Both are relevant in few moded fibre conditions. In many of these cases, numerical modeling is necessary in order to calculate the required gain and refractive index profiles 17, 25.

In passive fibres, the refractive index profile 25 alone is relevant in single moded structures, while launching conditions and mode scrambling along the fibre are also significant in the few moded and highly multimoded cases. It is therefore preferable when using a multimoded fibre to bend the fibre into a coil and/or to fully excite the fibre in order to achieve a stable and predictable output power distribution 161.

The numerical aperture 29 of the waveguide 1 (shown with reference to FIG. 2) can be between 0.05 to 0.2. The numerical aperture 25 of the waveguide 1 is preferably between 0.07 and 0.1 in order to increase the mode area and thus power handling capability of the waveguide 1. A fibre having a numerical aperture of around 0.07 is an example of a large mode area fibre.

Figure 11:
FIG. 11 shows third apparatus, which includes a laser, and which is for the industrial processing of a material by optical radiation.

FIG. 11 shows an apparatus that includes a laser 110 for providing the optical radiation 10. The apparatus can include an optional frequency conversion device 113 such as a frequency converter, a frequency doubler, an optical parametric oscillator, or a frequency tripler to convert the wavelength of the optical radiation 10. The waveguide 1 is a laser delivery fibre 111 that does not contain rare-earth dopant 15. The laser 111 can be such that it emits optical radiation 10 having substantially the same power distribution as the optical radiation 10 emitted by the waveguide 1. For example, the laser 110 can comprise the waveguide 1 shown in FIG. 1 with a refractive index profile 25 and gain profile 17 that is designed in accordance with present invention.

Figure 12:
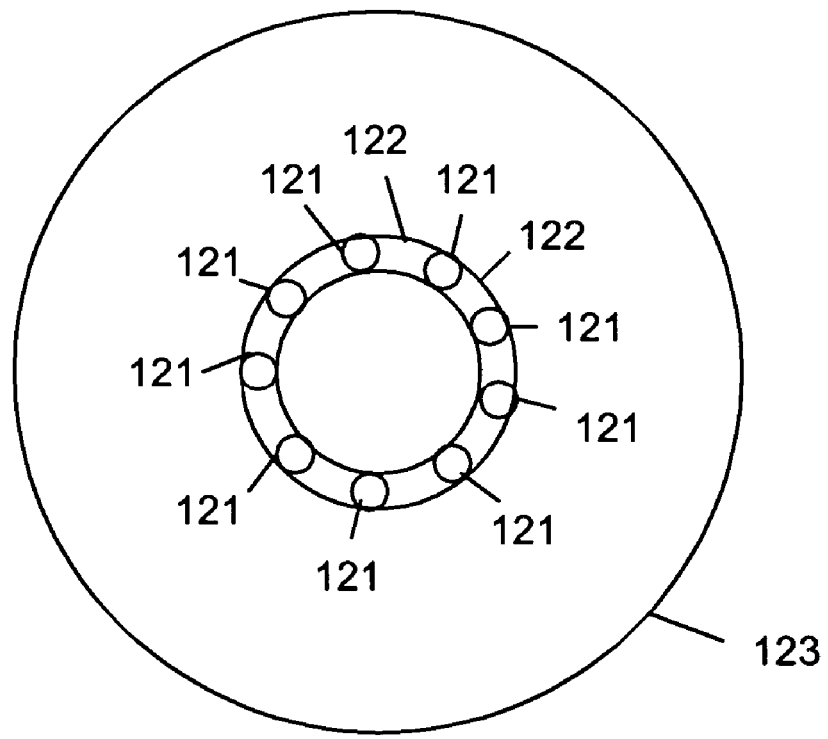
FIG. 12 shows the coupling of optical radiation from a plurality of lasers into a ring doped fibre.

Alternatively, the laser 110 can emit laser radiation 112 having a different power distribution than the optical radiation 10 emitted by the fibre 111. Such an arrangement is useful when coupling from single mode lasers into the fibre 123 such as shown in FIG. 12. Here the spots 121 represent the coupled power from the lasers 110, and the ring 122 is the core 7 of the fibre 123.

In the arrangements shown in FIGS. 11 and 12, the optical power distribution 16 on the material 6 is substantially the same as the power distribution in the cross-section of the fibre 111 or 123—that it is the near field power distribution 161 of the fibre 111, 123. For a multimode fibre having no rare earth dopant 15 and with all the guided modes excited, the near field power distribution 161 is substantially proportional to the refractive index profile 25 of the fibre. Thus the fibres 111, 123 can be configured to produce a desired power distribution for materials processing by designing its refractive index profile 25 to be proportional to the desired power distribution 16 on the material 6.

The constant of proportionality and/or the radial dimensions in the waveguide 1 can be obtained by consideration of the desired beam parameter product for the material processing application. The optical radiation 10 emitted from the waveguide 1 in FIG. 1 can be defined by a beam parameter product as shown in Table 1, where a wavelength of approximately 1090 nm has been assumed. By beam parameter product it is meant the beam parameter product in accordance with definition 1 of Table 1, which is the product of the focused beam radius and the divergence half angle, and has the units of mm.mrad. Table 1 also shows conversions to other definitions that are used in the industry to define beams (such as $M^2$, a second beam parameter product definition, and K). Assuming a step-index fibre (i.e., one whose core is circular and with a top-hat refractive index distribution), the conversion to fibre designs can be made as shown in Table 1 where the normalized frequency (V-value), numerical aperture and core radius are calculated.

For welding, cutting and drilling applications, the beam parameter product is usefully in the range from around 3 to around 300 (depending on working distance and the thickness of the materials involved). Preferably the range is around 8 to 15. For a fibre with a beam parameter product of around 11, the core numerical aperture can be around 0.07 and the diameter of the core can be around 300 μm. Alternatively, the core numerical aperture can be chosen to be in the range 0.05 to 0.2 and the diameter of the core to be selected to give the required beam parameter product. For example, a fibre having a core numerical aperture of 0.14 (double 0.07) and a core diameter of 150 μm (half 300 μm) will also have a beam parameter product of around 11.

Figure 13:
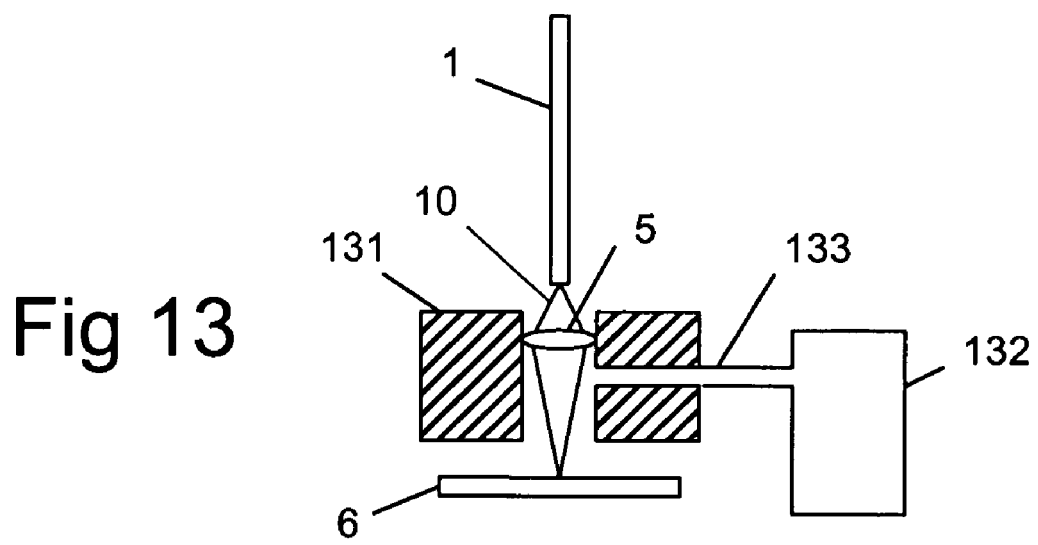
FIG. 13 shows fourth apparatus including a laser nozzle for gas-assisted cutting.

A preferred embodiment of the invention is shown in FIG. 13 in which the apparatus includes a laser nozzle 131 and a gas delivery system 132. Also shown is a pipe 133 for delivering gas from the gas delivery system 132 to the laser nozzle 131. The nozzle 131 and the gas delivery system 132 can be designed and used according to one of the following U.S. Pat. Nos. 5,220,149, 5,609,781, 5,747,771, 6,118,097, 6,288,363, 6,376,797 and 6,423,928, which are hereby incorporated herein by reference. The waveguide 1 can be any of the waveguides and fibres described herein. Advantageously, the waveguide 1 is a multimoded ring-doped fibre such as shown in FIGS. 4 and 5.

A ring-shaped core having a diameter of 5 μm, a thickness of 2 μm, and a numerical aperture of 0.1 will be single mode at 1000 nm. Other designs are also possible, and techniques to design single-mode waveguides can be found in many textbooks on optical fibre waveguide theory. Alternatively, the waveguide 30 can be a multi-mode waveguide, which will have either a higher numerical aperture or a thicker ring. Multi-mode waveguides are preferable because they allow for better definition in the optical power distribution on the surface of the material 6.

Use of a multimoded fibre allows well-defined optical power distributions to be obtained such as those shown in FIGS. 4 and 5, which have very sharp and well-defined edges. Such rectangular ring-shaped power distributions are difficult and/or expensive to obtain with single mode fibres, or by use of alternative technology such as diffractive optics, and can be obtained with higher efficiency.

An advantage of the power distributions according to the present invention (such as ring shaped, or multiple spots provided by a plurality of cores) is that the power of the laser beam required to process a material can be lower in many applications than if the laser beam were to be provided in the form of a conventional bell-shaped (Gaussian) or top-hat profile. This is because the energy at the centre of the beam profile is often not required to process the material. It is then possible to process materials with the same processing speeds using optical power levels lower by a factor of between 2 and 20. Tailoring the guidance profile of the waveguide in order to optimize the power distribution on the surface of the material to be processed can thus be seen to have major economic advantages, particularly with gas-assisted laser cutting where a 100 W of laser radiation having a doughnut, ring, or multi-spot power distribution on the surface of the material can have similar performance to a conventional 1 kW or higher power laser that delivers a top-hat or bell-shaped power distribution on the surface of the material. The invention is also far simpler and thus cheaper and more efficient than using diffractive or holographic techniques to convert a top hat profile to a ring-shaped power distribution on the surface of a material. It can also be temporally more stable.

The apparatus can be such that the waveguide 1 emits optical radiation having between 10 W and 1 kW of optical power. Alternatively, a lower power range of between 10 W and 200 W of optical power can provide equivalent performance to that achieved with more conventional top-hat laser profiles.

For very high-power applications, the waveguide 1 can be a so-called large mode area waveguide similar to those described in U.S. Pat. No. 6,614,975 (which is hereby incorporated herein by reference), but with a ring-doped profile. By large mode area, it is meant that the waveguide 1 can have a relatively low numerical aperture such that the mode field diameter of the fundamental mode is in the range 10 μm to 40 μm. The waveguide 1 can be operated such that it is effectively single moded. This can be achieved by bending a low-numerical aperture, multimode waveguide such that higher modes leak away leaving the fundamental mode in place.

A typical laser can be ytterbium doped, pumped with between 100 W and 2000 W of laser radiation, and delivering between 50 W and 1500 W of optical power. Advantageously, the laser can deliver around 100 W to 250 W of optical power, and can be combined in a laser nozzle with cutting gas such as oxygen for cutting sheet steel.

Figure 8:
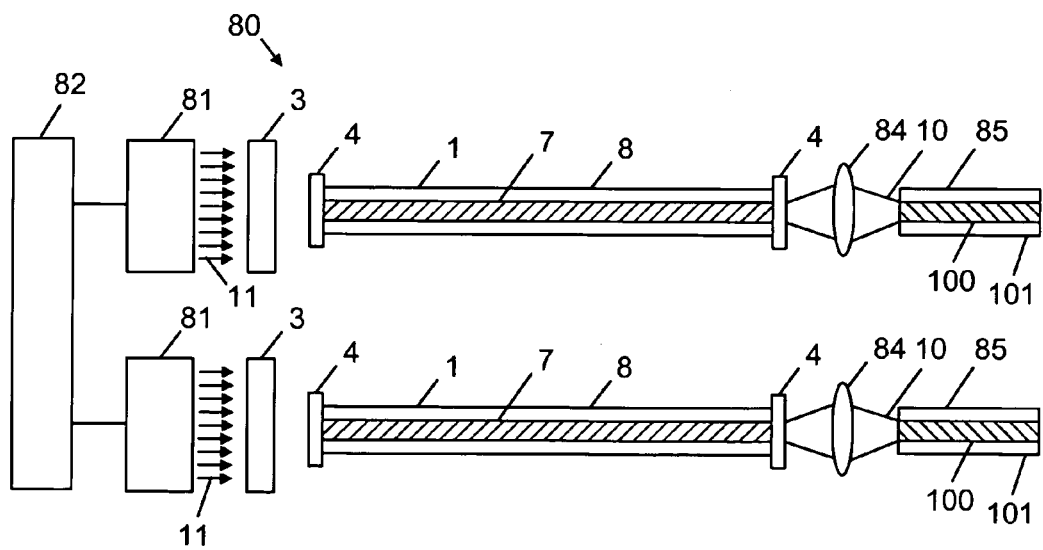
FIG. 8 shows second apparatus, which is in the form of a laser, and which is for the industrial processing of a material by optical radiation and which includes a laser delivery fibre.

FIG. 8 shows apparatus in the form of a laser 80 for materials processing. The laser 80 is pumped by pump radiation 11 supplied by diode stacks 81 driven by a controller 82. The laser 80 is shown as having two fibres 1, each providing optical radiation 10. The optical radiation 10 is coupled into laser delivery fibres 85 which direct the optical radiation to the material 6 for processing. The laser delivery fibres 85 can have their outputs beam combined or beam shaped together, or simply focused onto the same area or adjacent areas (useful for welding) of the material 6 for processing. Alternatively, or additionally, the two laser delivery fibres 85 can be used to provide optical radiation 10 on either side of a material 6 that is being processed.

Figure 9:
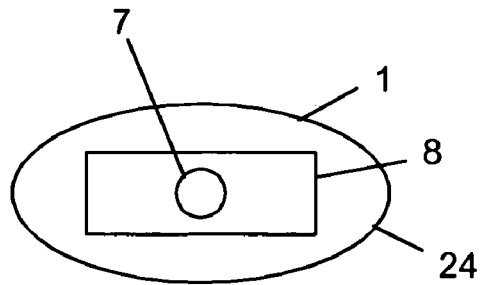
FIG. 9 shows the cross-section of a fibre used as a fibre laser.
Figure 10:
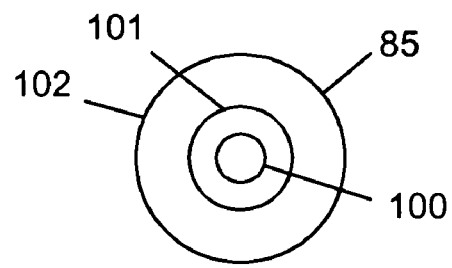
FIG. 10 shows the cross-section of a laser delivery fibre.

FIGS. 9 and 10 show example cross-sections of the fibre 1 and fibre 85. Fibre 1 has a cladding 8 having a substantially rectangular cross-section and is advantageously tailored to match the cross-section of the pump radiation 11 from the diode stacks 81. The pump radiation 11 can be beam shaped by the coupling optics 3, and if so, then the cross-section of the fibre 1 is configured to match the beam-shaped profile. Typical dimensions for the cladding 8 are in the range 0.3 mm to 2 mm in the smallest linear dimensions by 0.5 mm to 5 mm in the largest linear dimension. The fibre 1 can also be tapered along its length. The refractive index profile of the core 7 and cladding 8 is configured such that the fibre 1 provides the optical radiation 10 in a form suitable for materials processing. Examples of how to do this have been described above with reference to FIGS. 2 to 7 and with Table 1. For a beam parameter product of around 11, the numerical aperture of the core 7 with respect to the cladding 8 can be approximately 0.07, and the diameter of the core 7 can be around 300 µm. However other numerical apertures can be chosen in the range 0.05 to 0.1 and the core radius scaled such the V-value of the fibre 1 is the same. The pump delivery fibre 85 is advantageously circular and has a core 100 and cladding 101 configured to match the optical radiation 10. The product of the radius and numerical aperture of the core 100 with respect to the cladding 101 is ideally approximately the same as the radius and numerical aperture of the core 7 with respect to the cladding 8. The numerical aperture of the core 7 can be greater or equal to the numerical aperture of the core 100. Advantageously, the numerical aperture of the core 100 is greater than the numerical aperture of the core 7 in order to improve bend losses in the laser delivery fibre 85. The fibre 85 has a coating 102 which can be a polymer. Preferably, the optical radiation 10 has a power distribution such as shown in FIGS. 4 and 5. This can be obtained in a multimode fibre (in this case the waveguide 1 shown in FIG. 8) by doping the fibre with the rare-earth dopant 15 with a concentration profile 17 that is proportional to the power density. The laser delivery fibre 85 has a refractive index profile 25 that is proportional to the rare-earth dopant 17 in the multimode fibre.

The laser 80 can have a combined output power of 500 W to 50 kW, but preferably around 1 kW to 12 kW. The output powers of the two fibres 1 can be equal or different. Alternatively, the fibre 1 can have refractive index profiles which are proportional to the beam profiles shown in FIGS. 3 to 7. With such high output powers, the temperature of the fibres 1 needs to be carefully controlled. This can be achieved by applying metal coatings on the fibre 1 (for example during the drawing process) and then soldering the fibre 1 to a heat sink. Examples of metal coatings include chrome, gold and silver. A metal coating is not compatible with a polymer coating, and thus the cladding 24 is preferably thin (5 to 50 µm) and made from fluorosilica. Alternatively, or in addition, the fibre 1 can have large holes surrounding the core 7 in its cladding 8 designed to waveguide the pump radiation 11 along the fibre.

The core 7 and/or cladding 8 is preferably doped with a rare-earth dopant 15. The rare earth dopant 15 can be selected from the group comprising Ytterbium, Erbium, Neodymium, Praseodymium, Thulium, Samarium, Holmium and Dysprosium, or is Erbium codoped with Ytterbium, or is Neodymium codoped with Ytterbium.

For Ytterbium doping, the core can be co-doped with boron (to reduce the refractive index) in order to compensate the positive refractive index change induced by Ytterbium doping. This allows additional Ytterbium dopant to be incorporated thus decreasing the absorption length.

Other cladding pumped fibres and arrangements are also possible, such as those described in U.S. Pat. Nos. 4,815,079, 5,854,865, 5,864,644, 6,731,837, and 6,826,335, which are all are hereby incorporated herein by reference.

Alternatively, the waveguide 1 can be a holey (or microstructured) fibre that can include rare-earth dopant. The refractive index profile 25 of a holey fibre is the effective refractive index profile, that is, one that takes into account the holes in the fibre.

Figure 14:
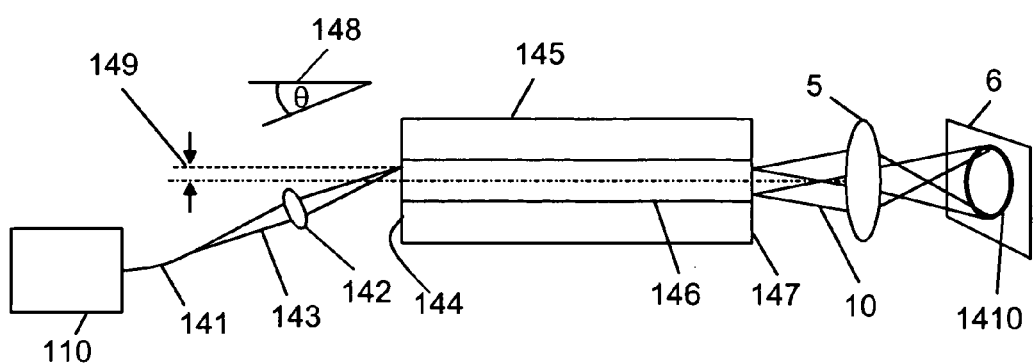
FIG. 14 shows a means of generating a doughnut shaped laser output from an end of an optical fibre by focusing a spot on its other end.

FIG. 14 shows an alternative means of generating optical radiation 10 in form substantially as shown in FIG. 4. Laser radiation 143 from a laser 110 is guided along a fibre 141. The laser radiation 143 is refocused by a lens 142 onto the multimode core 146 of a first end 144 of an optical fibre 145 at an angle θ 148 and offset 149. The angle θ 148 and offset 149 are selected such that groups of modes are excited in the optical fibre 145. These groups of modes are emitted from the second end 147 of the fibre 145 in such a way that focusing optics 5 can focus the optical radiation 10 into a pattern that approximates a ring 1410 on the surface of a material 6. This arrangement is particularly suited to high power fibre lasers having spectral widths greater than approximately 1 nm.

A similar apparatus is described by reference to FIG. 15. As discussed in W. A. Gambling et al, Applied Optics, Vol. 14, No. 7, July 1975, if a collimated beam 151 is incident on the first end 144 of the fibre 145 at an angle θ 148, the far field output pattern consists of a ring 152 that emerges from the second end 147 of the fibre 145, at substantially the same angle 153 as the angle θ 148. Changing the input angle θ 148 changes only the diameter 154 of the output ring 152. This assumes that there is little or negligible mode coupling within the fibre 145. At the other extreme, for a fibre that is fully mode mixed the output distribution is independent of launching conditions and consists of a circular patch of light, regardless of the input angle θ 148 provided that the angle 148 is within the numerical aperture of the fibre. In the intermediate case of partial mode mixing it is possible to obtain a somewhat diffuse and thickened ring for large input angles 148 (i.e., angles that are within 50% to 100% of the numerical aperture of the fibre.) The degree of mode conversion occurring in a particular fibre depends upon its mode conversion coefficient and length so that it is possible to obtain clear ring patterns at the output of fibers with high mode conversion coefficients if the length is sufficiently short. Nevertheless, Gambling et al. showed that with partially mode mixed fibres, a ring pattern is not obtained until a certain value of input angle θ 148 is reached. This method has been used in imaging systems, and can be further understood with reference to U.S.

Pat. No. 5,956,447, (see for example FIG. 10a of U.S. Pat. No. 5,956,447), which patent is hereby incorporated herein by reference. The diameter 154 of the ring can be adjusted using focusing optics at the output end 147 of the fibre 145, or by adjusting the input angle 148. The thickness 155 of the ring 152 can be adjusted by increasing the diameter of the core 146, or by decollimating the input beam 151 by adjusting the focusing of the lens 142. The apparatus of FIG. 15 thus provides a convenient way of forming a ring pattern 152 on the surface of a material, and will work with known gas, rod, disk and fibre lasers. It should be noted that the surface of the material may not be uniform, and may contain slots, holes or protuberances (particularly if the material is being processed by cutting or milling). "Surface of the material" as used herein is meant to be interpreted as being the surface of the material prior to processing (i.e., prior to a slot being cut into it, for example).

Figure 15:
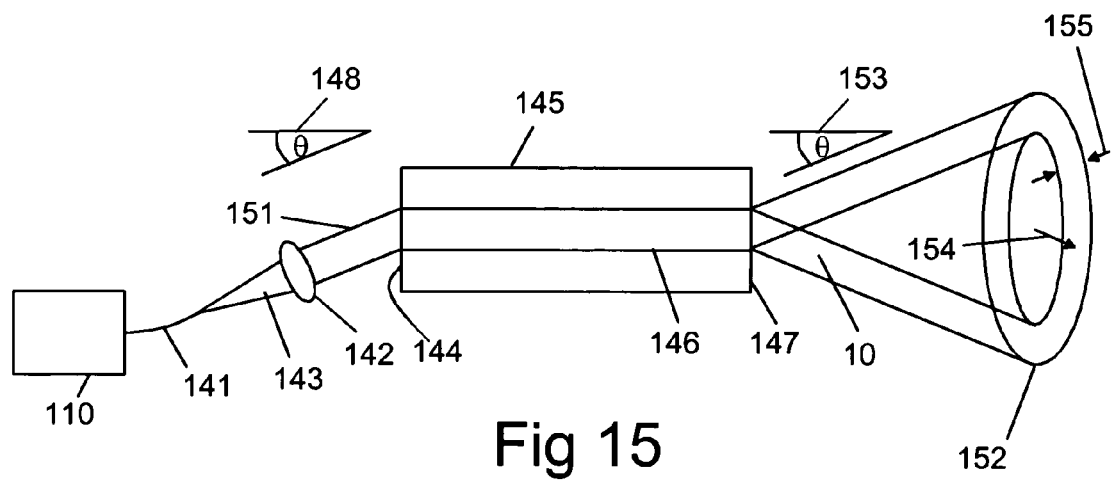
FIG. 15 shows a preferred embodiment of the invention that includes a mode converter.

The fibre 145 of FIGS. 14 and 15 can be a step-index multimode fibre, a graded index multimode fibre, or a multimode fibre having a core such as those shown in FIGS. 4 to 6.

The arrangements shown in FIGS. 14 and 15 are useful for both very coherent lasers as well as lasers having very broad spectral widths. They are thus advantageous for generating ring-shaped power distributions on the surface of materials when the laser source is a fibre laser. High power fibre lasers typically have spectral widths greater than 0.1 nm, and generally greater than 1 nm to 3 nm.

Figure 16:
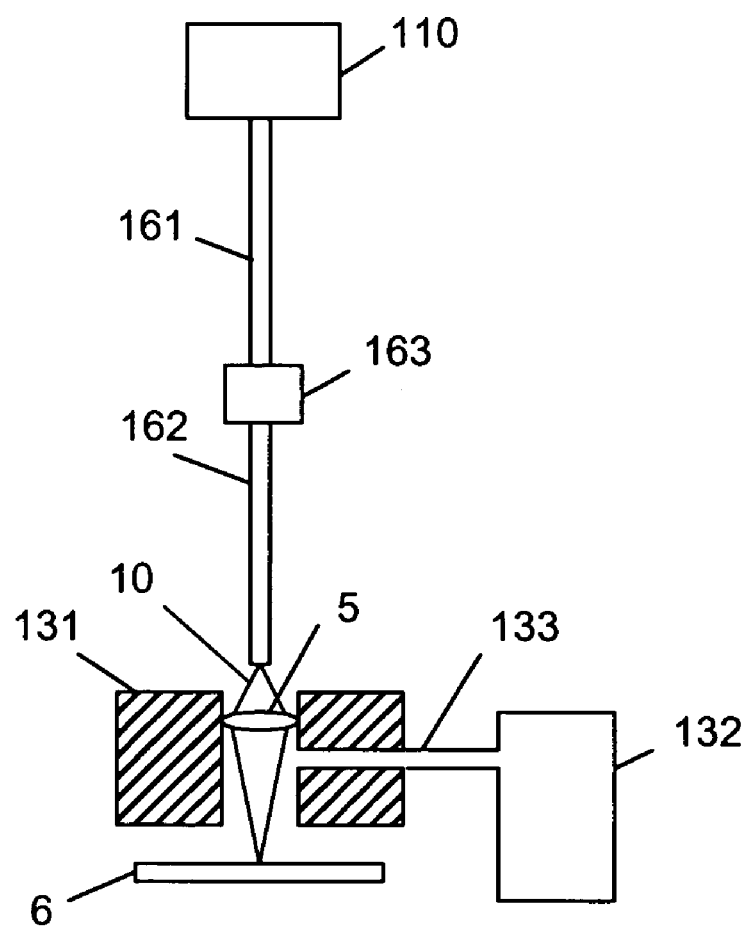
FIG. 16 shows an optical fibre coupled to an output fibre via a coupler.

FIG. 16 shows an optical fibre 161 coupled to an output fibre 162 via coupler 163. The coupler 163 can comprise a lens, a fusion splice, or a long-period grating that couples a fundamental mode to at least one higher-order mode of the output fibre 162. Long-period gratings that couple from a fundamental mode to higher order modes of optical fibres are described in U.S. Pat. No. 6,487,340, which is hereby incorporated by reference herein. The optical fibre 161 can be a single-mode or multimode optical fibre carrying laser radiation from the laser 110. The output fibre 162 can be the fibre 145 (described by reference to FIGS. 14 and 15). Alternatively, the output fibre 162 can be a multi-mode fibre having a ring-shaped core 122 similar to that shown in FIG. 12. Conveniently, the cores of at least one of the fibres 161 and 162 is offset to enable low-loss fusion splicing.

The optical radiation 10 in FIGS. 13 and 16 is preferably directed through the gas nozzle 131. Alternatively or additionally, the optical radiation 10 can be directed around the gas nozzle 131.

The laser 110 in the above figures and used with the above apparatus is preferably a fibre laser that is cladding pumped and that emits between 10 W and 1000 W of laser radiation. More preferably the fibre laser emits between 200 W and 500 W of laser radiation. By a fibre laser that is cladding pumped, it is meant either a cladding pumped fibre laser, or a laser system that includes at least one cladding pumped optical amplifier. Cladding pumped fibre lasers and amplifiers are described in U.S. Pat. Nos. 4,815,079, 5,854,865, 5,864,644, 6,731,837, and 6,826,335 which patents are hereby incorporated herein by reference.

Although the invention has been described with reference to solid-core fibres, the fibres of the invention can be implemented using single-mode or multi-mode "holey fibres" that contain longitudinally extending holes along their length to provide guidance.

The apparatus can be in the form of a laser, a Q-switched fibre laser, a master oscillator power amplifier, or a laser that contains a frequency converter. The term "fibre laser" as used herein is meant to include each of these laser and amplifier configurations.

It is to be appreciated that the embodiments of the invention described above with reference to the accompanying drawings have been given by way of example only and that modifications and additional components can be provided to enhance performance.

The present invention extends to the above-mentioned features taken in isolation or in any combination.

TABLE 1

| $M^2$ Conversion to Beam Parameter Product & K | | | | Fibre Design Assuming Step Index | | | | | |
|---|---|---|---|---|---|---|---|---|---|
| $M^2$ $M^2 = V/2$ | BPP Definition 1 $\omega\alpha = M^2 \cdot \lambda/\pi$ | BPP Definition 2 $\Delta\Theta = 4 \cdot M^2 \cdot \lambda/\pi$ | K $1/M^2$ | V | NA | r in um | d in um | Area in $um^2$ | Fibre Length in m |
| 0.30 | 0.10 | 0.40 | 3.33 | 0.6 | 0.07 | 1.45 | 2.89 | 18 | |
| 2.00 | 0.67 | 2.70 | 0.50 | 4 | 0.07 | 9.64 | 19.28 | 121 | |
| 3.00 | 1.01 | 4.05 | 0.33 | 6 | 0.07 | 14.46 | 28.92 | 182 | |
| 4.00 | 1.35 | 5.40 | 0.25 | 8 | 0.07 | 19.28 | 38.56 | 242 | |
| 5.00 | 1.69 | 6.75 | 0.20 | 10 | 0.07 | 24.10 | 48.20 | 303 | 5.00 |
| 7.50 | 2.53 | 10.12 | 0.13 | 15 | 0.07 | 36.15 | 72.30 | 454 | 3.33 |
| 10.00 | 3.37 | 13.50 | 0.10 | 20 | 0.07 | 48.20 | 96.40 | 606 | 2.50 |
| 12.50 | 4.22 | 16.87 | 0.08 | 25 | 0.07 | 60.25 | 120.50 | 757 | 2.00 |
| 15.00 | 5.06 | 20.24 | 0.07 | 30 | 0.07 | 72.30 | 144.60 | 909 | 1.67 |
| 17.50 | 5.90 | 23.62 | 0.06 | 35 | 0.07 | 84.35 | 168.70 | 1,060 | 1.43 |
| 20.00 | 6.75 | 26.99 | 0.05 | 40 | 0.07 | 96.40 | 192.80 | 1,211 | 1.25 |
| 22.50 | 7.59 | 30.37 | 0.04 | 45 | 0.07 | 108.45 | 216.91 | 1,363 | 1.11 |
| 25.00 | 8.44 | 33.74 | 0.04 | 50 | 0.07 | 120.50 | 241.01 | 1,514 | 1.00 |
| 27.50 | 9.28 | 37.11 | 0.04 | 55 | 0.07 | 132.55 | 265.11 | 1,666 | 0.91 |
| 30.00 | 10.12 | 40.49 | 0.03 | 60 | 0.07 | 144.60 | 289.21 | 1,817 | 0.83 |
| 32.50 | 10.97 | 43.86 | 0.03 | 65 | 0.07 | 156.65 | 313.31 | 1,969 | 0.77 |
| 35.00 | 11.81 | 47.24 | 0.03 | 70 | 0.07 | 168.70 | 337.41 | 2,120 | 0.71 |
| 125.00 | 42.18 | 168.70 | 0.01 | 250 | 0.07 | 602.52 | 1205.03 | 7,571 | 0.20 |
| 300.00 | 101.22 | 404.89 | 0.00 | 600 | 0.1 | 1012.23 | 2024.45 | 12,720 | 0.12 |

The invention claimed is:

1. Apparatus for the industrial processing of a material comprising a fibre laser, wherein the fibre laser is configured to emit optical radiation, the apparatus configured such that the optical radiation can form an optical power distribution on a surface of the material, the optical power distribution including first and second optical powers which are located at respective first and second radii from a centre of the optical power distribution and which are of substantially higher intensity than a third optical power which is located at a third radius from the centre of the optical power distribution and which is smaller than the first and the second radii, and wherein:

the fibre laser comprises a waveguide having an output end, wherein the waveguide is a single mode waveguide having a refractive index profile configured to provide an optical power distribution at the output end comprising a substantially ring mode power distribution;

the apparatus includes focusing optics configured to direct the optical radiation onto the material; the waveguide is defined by a guidance profile across its cross section, the guidance profile being defined by the refractive index profile and an optical gain profile;

the guidance profile and the focusing optics are configured to produce the optical power distribution on the surface of the material; and the optical power distribution at the output end of the waveguide is related to the optical power distribution at the surface of the material by an inverse transform of the focusing optics, and further wherein the guidance profile of the waveguide is an inversion of the optical power distribution at the output end of the waveguide.

2. Apparatus according to claim 1 and further comprising a laser nozzle and a gas delivery system configured to deliver a gas into the path of the optical radiation and to direct the gas to contact the surface of the material.

3. Apparatus according to claim 1 wherein the optical power distribution at the surface of the material has a ring-shaped power distribution.

4. Apparatus according to claim 1 wherein the optical power distribution at the surface of the material is defined by a central zone and outer regions, and the central zone has a higher power distribution than the power distribution at the outer regions.

5. Apparatus according to claim 1 comprising an optical fibre which is configured to guide optical radiation from the fibre laser to the material.

6. Apparatus according to claim 5 wherein the fibre laser is configured to emit optical radiation in substantially the same power distribution as the optical radiation emitted by the optical fibre.

7. Apparatus according to claim 5 wherein the fibre laser emits optical radiation having a different power distribution as the optical radiation emitted by the optical fibre.

8. Apparatus according to claim 1 wherein the apparatus is in the form of an optical amplifier, a laser, or a master oscillator power amplifier.

9. Apparatus according to claim 1 wherein the optical radiation is pulsed, modulated or continuous wave.

10. Apparatus according to claim 1 and including a frequency conversion device.

11. Apparatus according claim 1 wherein which the fibre laser is a cladding pumped fibre laser that is configured to emit the optical radiation having between 10 W and 1 kW of optical power.

12. Apparatus according to claim 11 wherein the fibre laser is configured to emit the optical radiation having between 100 W and 500 W of optical power.

* * * * *